United States Patent [19]

Maxey

[11] Patent Number: 4,524,858
[45] Date of Patent: Jun. 25, 1985

[54] EDGER TRANSPORT AND POSITION APPARATUS

[76] Inventor: Carl W. Maxey, P.O. Box 3210, Hattiesburg, Miss. 39403

[21] Appl. No.: 497,666

[22] Filed: May 24, 1983

[51] Int. Cl.³ .............................................. B65G 47/26
[52] U.S. Cl. ..................... 198/434; 198/376; 198/485; 414/750; 144/357; 83/367
[58] Field of Search ............... 198/375, 376, 434, 456, 198/394, 412, 413, 414, 488, 485, 774; 144/245 R, 245 E, 242 E, 357; 83/367, 371; 414/750

[56] References Cited

U.S. PATENT DOCUMENTS

| | | | |
|---|---|---|---|
| 3,970,128 | 7/1976 | Kohlberg | 144/357 |
| 4,044,886 | 8/1977 | Sender | 198/488 |
| 4,203,514 | 5/1980 | Hirai | 414/750 X |
| 4,240,477 | 12/1980 | Horn et al. | 144/357 X |
| 4,316,491 | 2/1982 | Kearnes et al. | 198/434 X |
| 4,340,137 | 7/1982 | Foster | 198/434 X |

Primary Examiner—Joseph E. Valenza
Assistant Examiner—Michael Stone
Attorney, Agent, or Firm—Kolisch, Hartwell & Dickinson

[57] ABSTRACT

Apparatus for the lateral feeding and transfer handling of successive cants into and through a wane scanning station, with subsequent adjusted-position placement on the infeed conveyor for an edger. Featured in the apparatus are a main carriage, which is driven reciprocally with what might be thought of as sinusoidal motion, and thereon a relatively moveable subcarriage which can translate, and rotate about a central upright axis, under the influence of a pair of conventional setworks. The subcarriage includes cant transport blades which directly support a cant, and which are rockable between raised and lowered positions and about axes which substantially parallel the reciprocation axis of the main carriage, all for the purpose of effecting a simple pickup and final hand-off transfer of a cant as it travels and is scanned on the fly between intake and discharge stations. During cant transfer, there is no relative movement occurring between the cant and the structure directly supporting it. Final hand-off of a position-adjusted cant occurs with longitudinal acceleration of the cant so that its contact with feed rolls in an edger conveyor takes place under matching-speed conditions.

6 Claims, 6 Drawing Figures

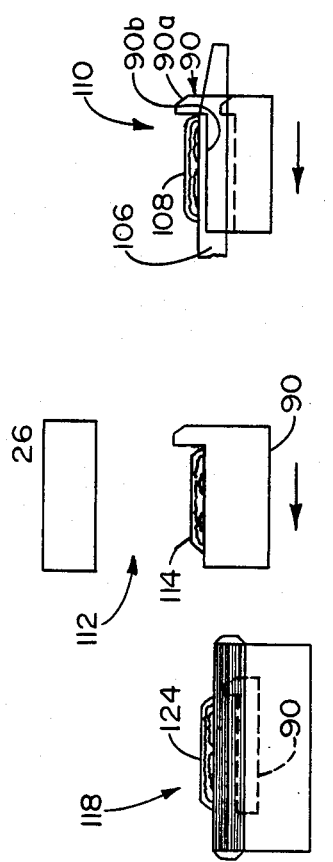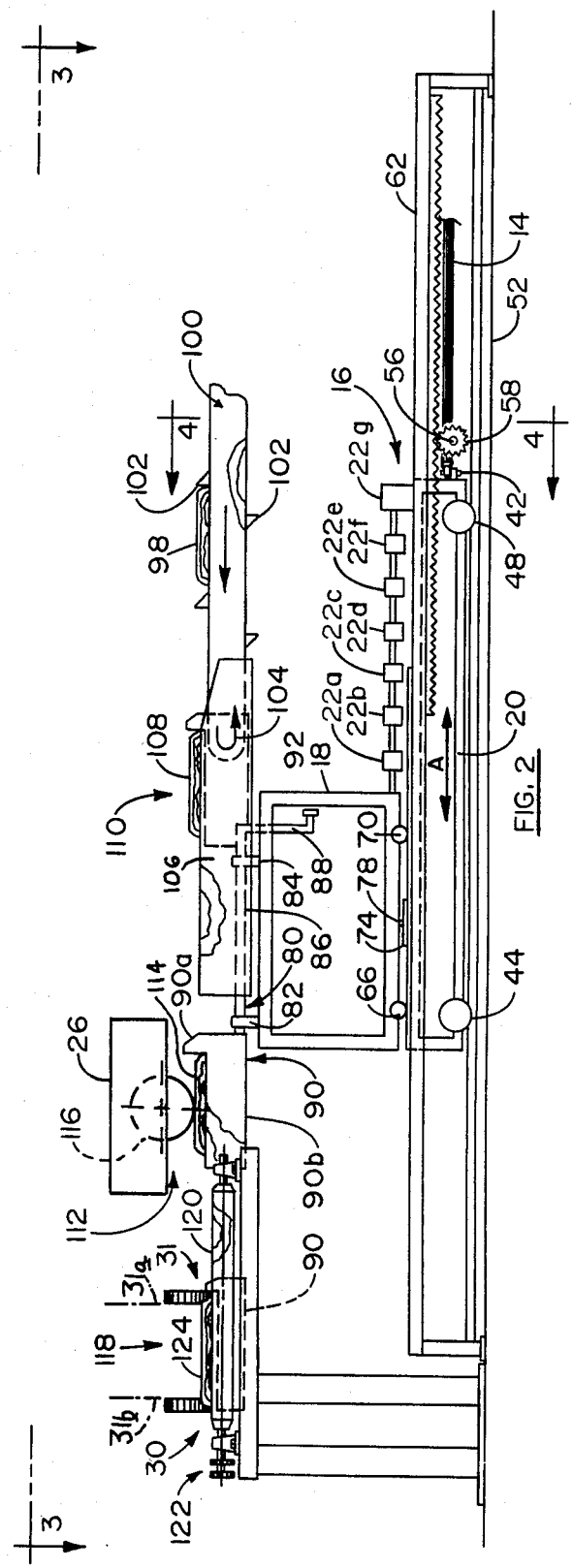

EDGER TRANSPORT AND POSITION APPARATUS

BACKGROUND AND SUMMARY OF THE INVENTION

This apparatus pertains to sawmill operations which plane the edges of a cant. In particular, this apparatus pertains to a cant axis alignment device which positions a cant for subsequent feeding through an edger.

A log entering a sawmill initially goes through a head rig where it is sawed into flat pieces of wood of varying thicknesses. These slabs are referred to as cants. The longitudinal edges of each cant are rounded, since each cant is a section which has been cut out of a round log. Each cant must be run through an edger or planer to remove its rounded edge or wane.

A conventional edger-feeder mechanism transports a cant to an edger in-feed position where the cant is fed through an edger. The edger removes the rounded edge portion of the cant, which is referred to as the wane. Some edger systems utilize a wane-scanning system, coupled with a computer, in order more efficiently to edge wood products. A wane-scanning device, such as that disclosed in U.S. Pat. No. 4,298,286 can generate data which may be processed to adjust an edger width, or to adjust the position of a cant upstream of an edger—the desired result being the most efficient and productive edging of a cant to produce the largest possible finished board. Various mechanisms have been devised to transfer a cant from a saw offload conveyor, through a wane-scanning system and then onto an edger in-feed conveyor. A cant is generally transported laterally toward and through a wane-scanner. The cant must then cease lateral movement and begin movement endwise, a change of motion through 90°. Some form of stop-start movement has been utilized to effect this 90° change of cant direction. Wane-scanning generally takes place prior to a cant beginning its endwise movement. The requirement of changing cant movement by 90° has been solved by stopping a cant at the end of one conveyor, moving it through a scanning station, and then positioning the cant on an edger in-feed conveyor while the infeed conveyor is stopped. The conveyor is then started and the cant moves endwise through the edger mechanism.

The described stop-start movement required to move a cant through an edger is difficult to achieve, and produces excessive wear on machinery which is stopped and started under heavy load conditions. Stop-start motion also results in some movement of a cant about its longitudinal axis, which can result in a cant moving through an edger improperly, thereby producing an over-edged, or narrow, board.

A general object of the present invention therefore, is to provide an efficient means of positioning a cant upstream of an edger.

Another object of the invention is to position a cant upstream of an edger through both rotational and translational movement of a cant about its longitudinal axis.

Yet another object of the present invention is to provide a cant transfer apparatus which produces a reciprocating sinusoidal motion with characteristic smooth yet rapid acceleration and deceleration.

A further object of the instant invention is to provide a smooth transition from edgewise to endwise motion of a cant, whereby a cant is accelerated to the speed of an edger in-feed conveyor.

The apparatus of the instant invention utilizes reciprocating sinusoidal motion to move a cant from an intake station through a wane-scanning station and thence to a discharge station in one smooth motion. The apparatus is capable of both translational and rotational movement which allows a cant to be deposited on an edger in-feed conveyor in proper alignment for edging. Reciprocating sinusoidal motion produces smooth rapid acceleration and deceleration which prevents the cant from rotating independently about its longitudinal axis, thereby allowing a more efficient edging operation.

Another feature of the apparatus of the instant invention is that it is capable of accelerating a cant endwise at the discharge station, matching the speed of the edger in-feed conveyor, producing a smooth transition between edgewise and endwise movement.

In an overall picture sense, the apparatus of the invention can be viewed as one wherein all of the actions involved in scanning, positioning and transferring a cant take place with this cant substantially continuously on the fly.

These and other objects and advantages of the instant invention will become more fully apparent as the description which follows is read in conjunction with the drawings.

DESCRIPTION OF THE DRAWINGS

FIG. 2 is a fragmentary side elevational view of the invention.

FIG. 6 is a schematic drawing showing progressive movement of a cant from an intake station, through a wane-scanner and to the discharge station.

DETAILED DESCRIPTION OF THE INVENTION

Figure 1:
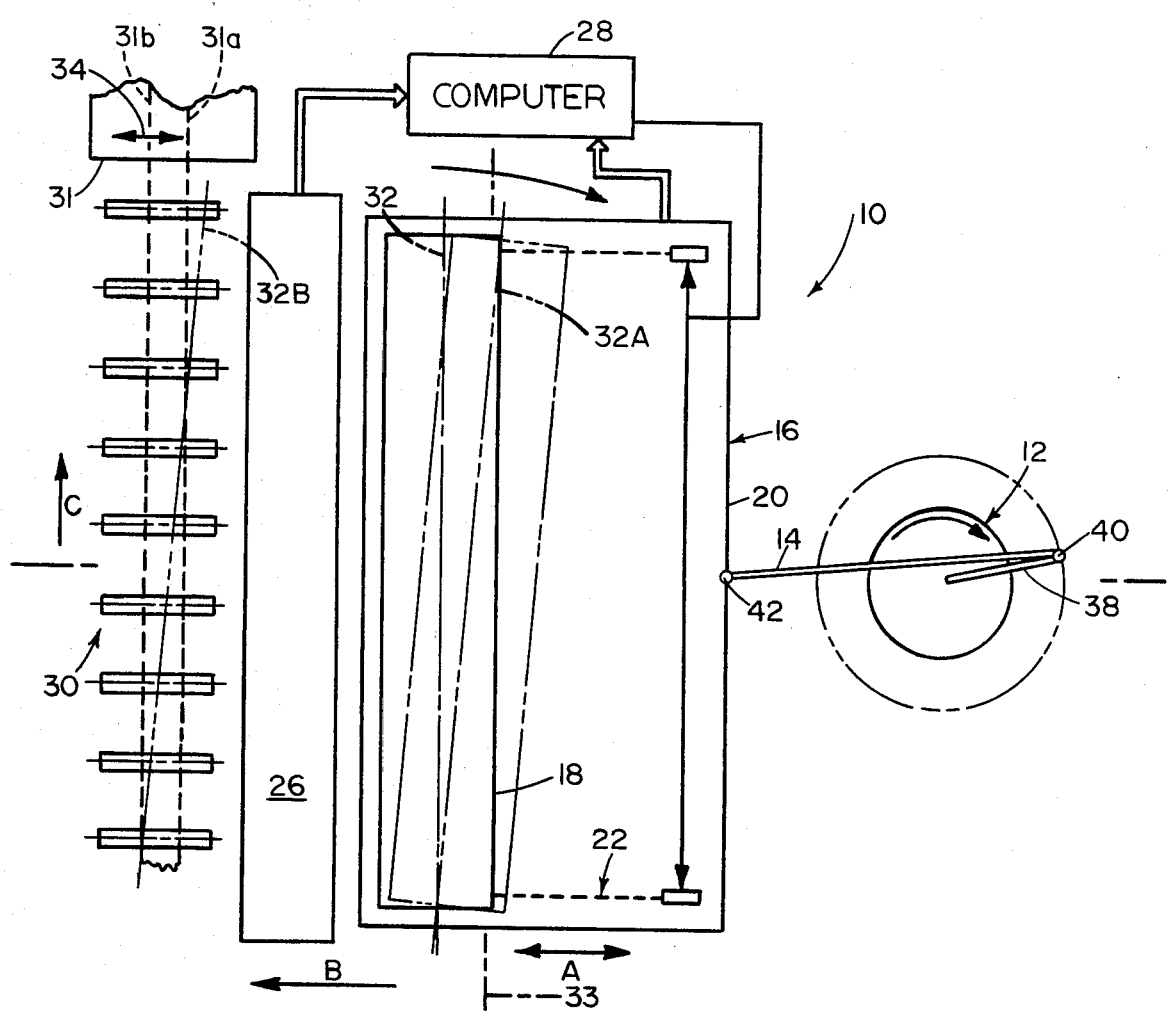
FIG. 1 is a schematic plan drawing of the apparatus of the invention.

Turning now to FIG. 1, an edger transport and position apparatus, or edger positioning assembly, is shown generally at 10. The apparatus includes a motor-driven crank wheel 12, a connecting arm 14, and a carriage assembly 16. Crank wheel 12 rotates, causing assembly 16 to oscillate, as shown by arrow "A" in what can be characterized as continuous reciprocal shifting with sinusoidal characteristics. Carriage assembly 16 includes a subcarriage 18 which is rotatably and translatably mounted on a main carriage 20. Rotation and translation of subcarriage 18 relative main carriage 20 is effected by a pair of length-adjustable means which take the form of two setworks 22, 24 in the preferred embodiment. A cant is picked up from an intake station (to be shown and described later), is supported by, and moves with the carriage assembly.

Carriage assembly 16 moves forward (left, as indicated by arrow B) carrying the cant under a wane-scan, mechanism or wane scanner, 26. Data from wane scanner 26 is processed by a computer 28, which activates set works 22, 24, thereby causing proper rotation/translation of subcarriage 18. The cant is deposited on an edger in-feed conveyor 30. The cant is accelerated in the direction of arrow "C" by an element of subcarriage 18 to be discussed later herein. Conveyor 30 transports a cant to a conventional edger 31, which herein is of the chipper head type. Edger 31 includes the usual fixed chipper head which is adapted herein to trim wane along a cutting path whose projection is indicated by dashed line 31a in FIG. 1, and a shiftable chipper head, moveable toward and away from the fixed chipper head for cutting along a spaced parallel cutting path which is indicated by a projection thereof shown as dashed line 31b in FIG. 1. Lateral positioning of the shiftable chipper head is performed in a conventional manner within the edger to shift the head back and forth toward and away from the fixed chipper head as indicated by double-ended arrow 34.

Subcarriage 18 has an axis 32, and is shown therewith (carriage in full lines) in a full-forward, non-rotated position for the subcarriage relative to the main carriage. One will note that in this particular position, axis 32 substantially parallels the longitudinal axis, shown at 33, for main carriage 20. To give a somewhat exaggerated single illustration of how the apparatus so far generally described performs, with subcarriage 18 in the position shown for it in solid lines in FIG. 1 relative to the main carriage, and with the whole carriage assembly substantially in the position shown for it in the figure, as this whole assembly begins to move to the left in the direction of arrow B, and with the cooperation of other means still to be described, the subcarriage picks up a cant which has been suitably presented, and transports it (with continued movement of the entire carriage assembly) under scanner 26 which develops data relating to wane in the cant. Wane-scan data generated by the scanner is analyzed by computer 28 which makes a determination respecting how the cant should be oriented for placement on conveyor 30. Let us assume, for the purpose of this illustration, that the computer determines that the cant, for proper edging, must be shifted somewhat to the right in FIG. 1 relative to the body of the main carriage, and rotated slightly clockwise, this information is communicated in the form of appropriate electrical control instructions to the setworks, which then adjust the position of the subcarriage appropriately relative to that of the main carriage. More particularly, the setworks draw the subcarriage to the right in FIG. 1 relative to the main carriage, and also cause it to rotate by the amount determined by the computer. In dashed-double-dot lines in FIG. 1, a thus translated and rotated adjusted position for the subcarriage is shown, greatly exaggerated for illustration purposes. More specific information about how rotation and translation take place, according to certain important features of the invention, will be presented later.

This translational and rotational adjustment, while depicted in FIG. 1 with the entire carriage assembly completely to the right of scanner 26, actually takes place while this whole assembly continues to travel in the direction of arrow B, on the fly, so-to-speak, toward conveyor 30.

Directing attention for a moment to the translated and rotated adjusted position shown for subcarriage 18, it will be seen that axis 32 has shifted to the position shown at 32A in dash-double-dot lines relative to the main carriage. Still simply for the purpose of illustration, let us assume that the cant which is being supported by the subcarriage has its longitudinal axis precisely aligned with the longitudinal axis of the subcarriage. In reality, this would probably rarely be the case, but an assumption that it is true here will aid the continuance of this operational description. The decision which has been made by the computer which effected translation and rotation will have been made with the view, obviously, toward achieving the best final placement of the cant on conveyor 30. With substantially full travel of the entire carriage assembly in the direction of arrow B in FIG. 1, the longitudinal axis of the subcarriage, and hence, the long axis of the cant, will lie over conveyor 30 substantially in the position shown in dash-double-dot lines at 32B.

Recalling for a moment the earlier general description about edger 31, dashed line 31a represents a projection of the fixed right-hand cutting plane in the edger, and dashed line 31b represents a similar projection of the left hand moveable cutting plane in the edger. By another conventional control connection (not shown) between computer 28 and control mechanism in the edger, the wane-scan data developed as just outlined is employed to select the proper position for cutting plane 31b. This plane is adjusted appropriately either to the left or to the right in FIG. 1, as indicated by double-ended arrow 34, so that when the cant now being talked about is finally placed, as will later be described, on conveyor 30, not only will its axis lie as depicted along line 32B, but its lateral position will be oriented relative to cutting planes 31a, 31b appropriately.

With handoff transfer of the cant to conveyor 30, the latter transports the same in the direction of arrow C, with the axis of the cant remaining at the angle shown for line 32B, and with the cant ultimately being presented to the chipper heads in the edger to produce trimming along cutting planes 31a, 31b. While this is taking place, the carriage assembly, under the influence of wheel 12, is now returning to the right in the figure to initiate a new cycle of operation. Simultaneously, the setworks readjust themselves to the conditions initially described, with subcarriage 18 retranslated and rerotated, relative to the main carriage, to the position shown for it in solid lines in FIG. 1, which is referred to herein as a default position.

Turning now to FIGS. 2 through 6, the apparatus of the invention is shown in greater detail. Motor-driven crank wheel 12 is powered by a motor/gear train 36 with speed-varying capability. Connecting arm 14 is attached to wheel 12 by means of a crank wheel arm 38, and a pivot connection 40, and is attached to main carriage 20 by another pivot connection 42.

Main carriage 20 (see particularly FIGS. 2 and 3) is supported by, and rolls on, four suitable support wheels 44, 46, 48, 50. These wheels travel on a pair of spaced-apart guide rails 52, 54. An equalizer shaft 56 connects a pair of toothed wheels 58, 60 (FIGS. 2 and 4) which coact with a pair of gear racks 62, 64, respectively.

Subcarriage 18 is moveably mounted on main carriage 20. The moveable mounting includes a pair of front wheels, such as wheel 66 and rear wheel such as wheel 70. Guidance for the subcarriage is provided by a pair of elongated, laterally spaced guide tracks 74, 76 (see FIG. 4) which are mounted on main carriage 20, and a cooperative pin-like control guide projection 78 which is mounted on the underside of subcarriage 18. Tracks 74, 76 extend in a direction which substantially parallels the direction of reciprocation produced in the carriage assembly by wheel 12, and these tracks permit relative translation between the main and subcarriages in this same direction, while inhibiting translation at right angles thereto. Further, the tracks and projection 78 cooperate to permit relative rotation between the main and subcarriages substantially about what might be thought of as the vertical axis of the projection.

In the preferred embodiment, movement of subcarriage 18 relative to main carriage 20 is controlled by conventional setworks 22, 24. These setworks include a series of pneumatic rams, 22a, 22b, 22c, 24d, 22e, 22f, 22g, and 24a, 24b, 24c, 24d, 24e, 24f, 24g, respectively. The rams of the setworks are independently controlled by computer 28, each ram extending and contracting a preselected amount: a—1/16-inch, b—⅛-inch, c—¼-inch, d—½-inch, e—1-inch, f—2-inches, and g—4-inches. Either end of subcarriage 18 may independently move translationally or rotationally relative main carriage 20 a maximum of about 7 15/16-inches.

Forming a part of subcarriage 18 according to an important feature of the invention are plural, laterally spaced moveable elements 80 which are rockably mounted on subcarriage 18. Elements 80 are the particular devices herein which directly provide transfer and handoff handling support for successive cants. Each element includes a shaft portion 86 rockably supported by a pair of bearings 82, 84. Each shaft portion 86 terminates at one end in a crank portion 88, and at its other end in a cant-carrying blade 90 which further includes a rear cant-restraining dog 90a and a cant carrier part 90b.

Figure 4:
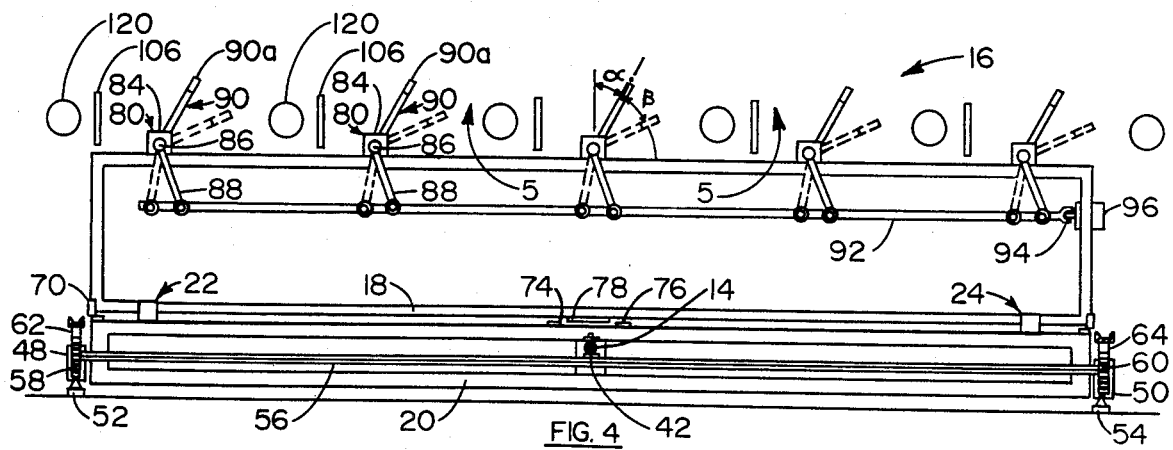
FIG. 4 is a fragmentary rear elevational view of a carriage assembly employed in the apparatus of the invention, taken generally along line 4—4 in FIG. 2.

Referring specifically now to FIG. 4, crank portions 88 are pivoted to a common control drive rod 92 which, in turn, is connected by a clevis mount 94 to the rod end of an actuating cylinder 96. Extension and contraction of cylinder 96 rocks the blades in elements 80 from the substantially upright cant-carrying positions (shown in solid lines), to tipped positions (shown in dashed lines). Each blade's upright position is displaced from the vertical by an angle $\alpha$, and blade's tipped position is further displaced by an angle $\beta$. Angles $\alpha$ and $\beta$, in the preferred embodiment, have values of about 25° and 35°, respectively. Carrier parts 90b are positioned in such a manner that under all rocked conditions their upper edges lie below a level which is referred to herein (and described later) as an intake level. This insures that each successive cant resting at the intake level contacts blade dogs 90a before coming to rest on parts 90b. The position of each cant relative to subcarriage 18 is thus "known" to computer 28. The combination of moveable elements 80, rod 92, and cylinder 96 comprises what is herein referred to as carrier means.

Figure 3:
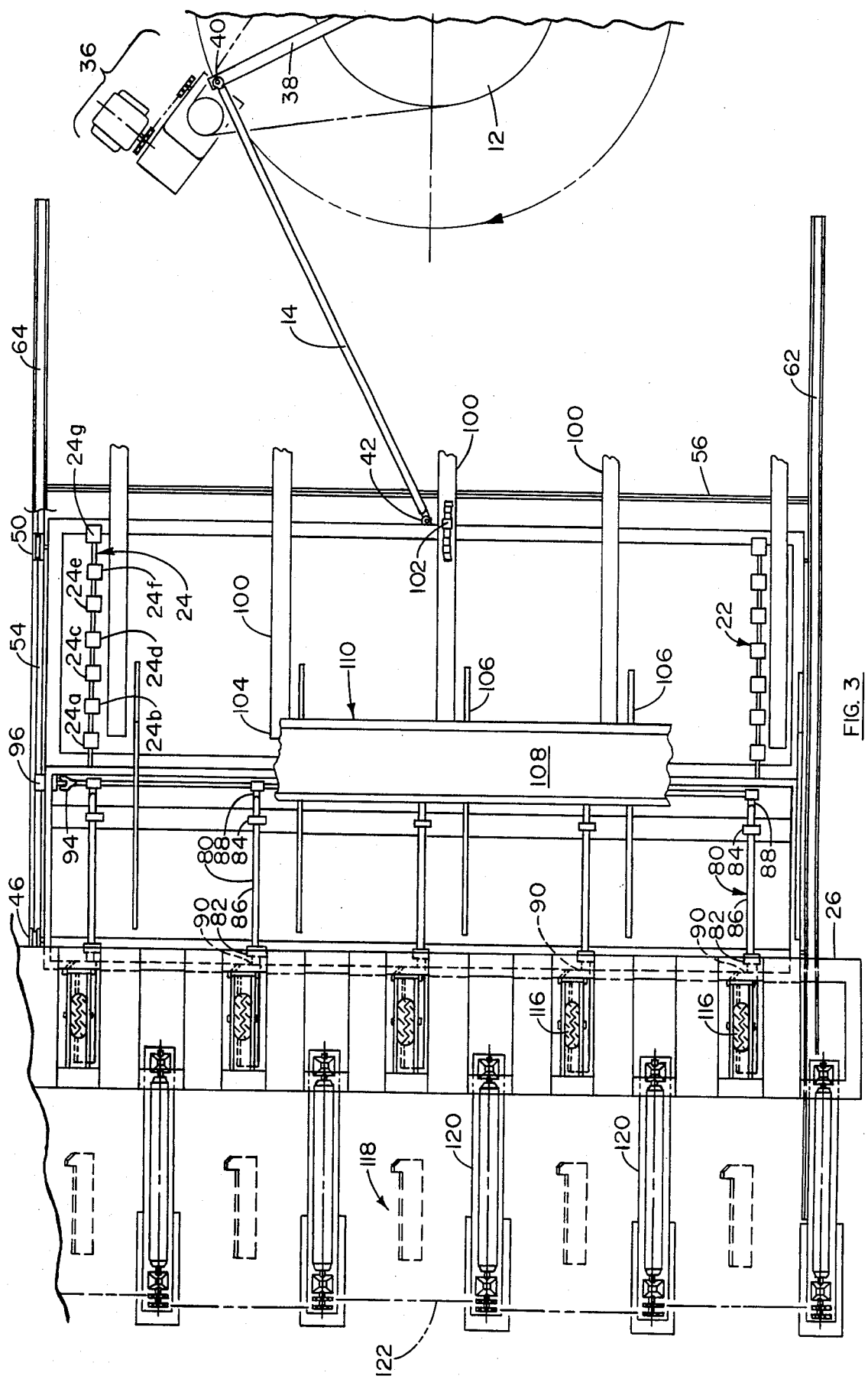
FIG. 3 is a fragmentary top plan view, taken generally along line 3—3 in FIG. 2.

Continuing now with a mixed structural and somewhat functional description, and referring particularly to FIGS. 2 and 3, a cant 98 is positioned adjacent the edger positioning assembly by means of a set of feed-in mechanisms 100. Each mechanism 100 includes a chain conveyor with dogs, such as those shown at 102. When a cant, such as cant 98, comes adjacent the off-bearing ends of mechanism 100, such the end shown at 104, it is pushed onto a set of plural skids, 106, the top edges of which define the previously mentioned intake level. A cant so positioned to the skids rests in a position like that indicated for another cant 108 which resides downstream from cant 98. This region in the apparatus is referred to herein as an intake station 110. A wane-scan station 112 is located beneath wane-scanner 26. Wane-scanner 26 incorporates a series of scanning devices, generally located on one-foot centers across the length of scanner 26. Scanner 26 is associated with a set of pressure wheels 116 to provide downward pressure on a cant, such as downstream cant 114, thereby holding the cant being scanned a known distance below scanner 26.

A discharge station 118 is located adjacent conveyor 30. Conveyor 30 includes a set of conveyor rollers 120, which are driven by a suitable drive chain 122. As carriage assembly 16 moves forward, the blade elements mesh with these conveyor rollers for deposition of a cant, such as that shown at 124, in proper alignment to proceed through edger 31 for chipper edging in planes 31a, 31b.

Figure 5:
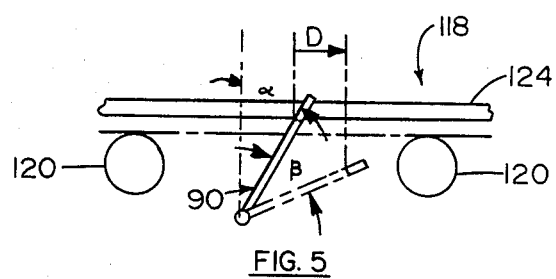
FIG. 5 is an enlarged fragmentary rear elevational view focussing on details of a discharge station, taken generally along line 5—5 in FIG. 4.

Let us consider now how the apparatus of the invention performs during a typical operating cycle, and in conjunction with this description, let us also now consider the schematic illustrations in FIGS. 5 and 6 along with what has been shown and described already respecting FIGS. 1-4, inclusive.

As has just been mentioned briefly, successive cants which are to be scanned and then edged are transported by mechanisms 100 to intake station 110 where they rest in succession on the tops of skids 106. In FIGS. 2 and 6, previously mentioned cant 108 is shown in such a position. With cyclic operation of crank wheel 12, and specifically, with the wheel in a condition drawing the carriage assembly to its right-most position in FIGS. 2 and 3, blades 90 have the longitudinal positions in the apparatus, relative to the right-hand ends of the skids, as is illustrated in FIGS. 2 and 6. During the time that the crank wheel is withdrawing the carriage assembly thus to the right, cylinder 96 (see FIG. 4) is fully extended, with the result that blades 90 occupy their fully lowered $\alpha+\beta$ positions shown in dashed lines in FIGS. 4, 5 and 6, and in dash-dot lines in FIG. 2. In this condition of the blades, dogs 90a therein reside below the level of the top edges of skids 106, and thus clear the base of a cant supported on the skids. With substantially full travel of the carriage assembly to the right in FIGS. 2, 3 and 6, cylinder 96 is contracted to rock the carrier blades upwardly to their $\alpha$ angle positions shown in solid lines in FIGS. 2, 4, 5 and 6 with the consequence that the upper edges of parts 90b lie slightly below the plane of the top edges of skids 106 with dogs 90a projecting above this level.

Continued operation of the crank wheel now drives the entire carriage assembly to the left in the figures with dogs 90a engaging the cant then resting in the intake station and driving it to the left along the skids until, slightly beyond the downstream ends of the skids, the cant drops onto the upper edges of blade parts 90b. It should be mentioned that throughout the operation so far described, setworks 22, 24 are in their fully extended default conditions. The cant which has just been dropped onto the upper edges of blades parts 90b is transported thereby beneath the wane scanner, held firmly against the blades by pressure wheels 116. As the continuously traveling cant is scanned by the scanners, the individual scanning devices therein feed data instantaneously to computer 28, which makes an appropriate determination respecting how the cant should be positioned for final placement on edger feeder conveyor 30. In this connection, immediately as the last bit of wane scan data is acquired from the cant, the computer transmits appropriate control signals to the setworks to effect what, if any, longitudinally translational, and rotational, adjustments are required in the position of subcarriage 18 relative to main carriage 20. Important to note at this point in time is that translation and rotation of a cant, or either of these motions, occurs without there being any relative movement between the cant and the structure directly supporting it, i.e., the upper edges of blade parts 90b. Because of the interaction of projection 78 and guide rails 74, 76, any rotational positioning always takes place about the same known axis relative to the subcarriage. This feature of the invention minimizes the likelihood of mispositioning resulting from rotation during each successive cast about an unknown different upright axis.

Still with continuous travel of the entire carriage assembly, final positional adjustment for the cant takes place with the cant still on the fly, so-to-speak, ultimately with blades 90 interleaving with conveyor rolls 120 to support the just-scanned cant appropriately over these conveyor rolls. As soon as the cant is properly positioned relative to the long axis of conveyor 30, and still under the influence of computer 28, cylinder 96 extends to accomplish two important transfer functions. First, it lowers the just-scanned cant onto the rolls in conveyor 30 for transport into and through the edger. Second, and as can be seen by looking particularly at FIGS. 4 and 5, rocking of the blades to impart this lowering action also accelerates the cant to the right in these figures, in the same direction in which the cant will be transported once it is under the driving influence completely of conveyor rolls 120. This action, according to the invention, has been so designed that the downward lowering and simultaneous longitudinal acceleration result in a cant being placed on the conveyor rolls at the longitudinal transfer speed which substantially matches that of the conveyor rolls. As a consequence, there is little likelihood that final transfer to complete control of the edger conveyor will produce any inadvertent misalignment of the now properly adjusted cant. Different systems, of course, operate with different specific travel speeds, depending upon the particular operating circumstances and sizes and types of wood involved, and it will be a matter of relative simplicity to one skilled in the art, based on the disclosure herein, to design this feature in the invention precisely to match a selected set of operating speeds and conditions.

Thus a new edger transport and positioning apparatus has been disclosed. The apparatus provides a novel means of picking up, transporting and depositing a cant through a wane-scanning station, which does not require any movement of a cant relative to its support mechanism throughout pick-up, sensing and deposition.

The reciprocal sinusoidal motion of the carriage assembly provides for smooth acceleration and deceleration which prevent slipage of a cant once it has been picked up on the support blades. The movement of the cant is very smooth throughout the transfer from intake to discharge.

At the discharge station, the cant is accelerated endwise to match the tangential velocity of rollers in the edger in-feed conveyor. The rollers, therefore, do not have to be stopped and started repeatedly as successive cants are deposited on the conveyor.

While the present invention has been particularly shown and described with reference to the foregoing preferred embodiment, it will be readily understood by those skilled in the art that other changes in form and detail may be made without departing from the spirit and scope of the invention.

It is claimed and desired to secure as Letters Patent:

1. Sawmill apparatus adapted for the continuous-motion, adjustable, non-handoff, transfer of successive, elongate cants moved transversely of their longitudinal axes between intake and discharge stations, which stations are disposed respectively on the upstream and downstream sides of a wane-scanning station, where the wane-scanning station included means that generates, for each scanned cant, related wane-trim data, and the discharge station is positioned upstream from a wane-trim edger, said apparatus comprising
   a first moveable carriage adapted for continuous, recurrent, reciprocal shifting between such an intake station and such a discharge station through such a wane-scanning station,
   a second moveable carriage mounted for position adjustment on and relative to, and moveable with, said first carriage, including carrier means for supporting a cant transferred by the apparatus, and
   position-adjustment means operatively interposed between said first and second carriages, adapted for operative connection to such a generating means in such a wane-scanning station to respond thereto regarding each scanned cant, thus to adjust the position of said second carriage relative to said first carriage, while the latter moves, in accordance with and as required by related wane-trim data, said means being constructed to accommodate both horizontal translational and rotational relative movement between the two carriages, with such rotational movement occurring about an upright axis which is fixed relative to said second carriage.

2. The apparatus of claim 1, wherein said carrier means includes moveable elements operable to place a carried cant in such a discharge station and therein to impart to such a cant a predetermined endwise velocity directed toward such an edger.

3. The apparatus of claim 1 which further is adapted for use in a setting where such a discharge station is at least partially defined by the tops of plural, laterally spaced, substantially horizontal, power-driven rolls in an endwise roll conveyor wherein the rolls turn with a preselected tangential velocity, and wherein said carrier means comprises plural, elongated, laterally spaced, substantially parallel blades shiftable, with movement of said first carriage toward such a discharge station, to positions interleaved with such rolls, and mounted for coordinated, simultaneous, limited, reversible rocking about their long axes so as to be capable of depositing a carried cant downwardly onto such rolls, with simultaneous endwise acceleration of the cant to impart thereto a longitudinal velocity substantially matching said preselected tangential velocity at the moment of such deposit.

4. The apparatus of claim 1 which further includes drive means operatively connected to said first carriage for producing therein such reciprocal shifting with sinusoidal characteristics.

5. The apparatus of claim 1, wherein said carrier means includes plural, spaced, elongated blades which, with operation of said position-adjustment means, move as a unit to adjust the position of a carried cant relative to said first carriage without translational or rotational motion occurring between such a cant and the blades.

6. The apparatus of claim 5, wherein said position-adjustment means includes a pair of spaced length-adjustable means operable to effect such movements.

* * * * *